US007881678B2

(12) United States Patent
Menden et al.

(10) Patent No.: US 7,881,678 B2
(45) Date of Patent: Feb. 1, 2011

(54) WIRELESS DEVICE FOR PHYSICAL COUPLING TO ANOTHER OBJECT

(75) Inventors: Thomas Menden, New Berlin, WI (US); Timothy Gamroth, Dousman, WI (US); Jerel Scott Jamieson, Eagle, WI (US)

(73) Assignee: Johnson Controls Technology Company, Holland, MI (US)

( * ) Notice: Subject to any disclaimer, the term of this patent is extended or adjusted under 35 U.S.C. 154(b) by 643 days.

(21) Appl. No.: 11/961,885

(22) Filed: Dec. 20, 2007

(65) Prior Publication Data

US 2009/0163151 A1 Jun. 25, 2009

(51) Int. Cl.
*H04B 1/38* (2006.01)

(52) U.S. Cl. ................ 455/90.3; 455/575.1; 455/575.7; 455/575.8; 455/347; 455/348; 455/349; 455/11.1; 439/11; 439/13; 439/14; 439/207; 439/208; 439/210; 174/59; 174/60; 174/61; 174/63; 174/64; 248/127; 248/130; 248/131; 248/132; D14/140; D14/140.4; D14/140.6

(58) Field of Classification Search ............. 455/575.1, 455/575.7, 575.8, 90.3, 347, 348, 349, 11.1; 439/11, 13, 14, 207, 208, 210; 174/59, 60, 174/61, 63, 64; 248/127, 130, 131, 132; D14/140, 140.4, 140.6
See application file for complete search history.

(56) References Cited

U.S. PATENT DOCUMENTS 5,218,356 A * 6/1993 Knapp ........................ 342/350
5,722,076 A * 2/1998 Sakabe et al. ............... 455/450
5,742,895 A * 4/1998 Tanigawa et al. ........... 455/90.3
5,852,405 A * 12/1998 Yoneda et al. ......... 340/825.02
5,940,771 A * 8/1999 Gollnick et al. ............. 455/517
5,946,617 A * 8/1999 Portaro et al. ............ 455/422.1
D428,361 S 7/2000 Jones
6,614,126 B1 * 9/2003 Mitchell ..................... 307/9.1
6,642,899 B2 * 11/2003 Strickland et al. ........... 343/773
D484,497 S 12/2003 Alviar et al.
D490,080 S 5/2004 Alviar et al.
D494,134 S 8/2004 Murzanski
D494,156 S 8/2004 Chen et al.
D504,679 S 5/2005 Huang
D519,101 S 4/2006 Alwicker et al.
7,027,431 B1 * 4/2006 Thompson .................. 370/352
D533,111 S 12/2006 Taddia
7,162,258 B2 * 1/2007 Beach et al. ................ 455/461
D548,731 S 8/2007 Liu et al.
D551,219 S 9/2007 Takisawa et al.
D552,610 S 10/2007 Newby et al.
D553,610 S 10/2007 Tragatschnig (Continued)

*Primary Examiner*—Tuan A Tran
(74) *Attorney, Agent, or Firm*—Foley & Lardner LLP

(57) ABSTRACT

One embodiment of the present disclosure relates to a radio frequency (RF) device for communicating on a wireless network. The device includes an antenna coupled to an RF circuit. The device further includes a body housing the RF circuit and the antenna. The device yet further includes a support member extending from the body. The support member is configured to be coupled to an object. The support member is prevented from moving laterally and vertically relative to the object when coupled to the object. The support member and body are configured to allow the body and the antenna to rotate about an axis when the support member is prevented from moving laterally and vertically relative to the object.

23 Claims, 13 Drawing Sheets

U.S. PATENT DOCUMENTS

D556,190 S 11/2007 Liu et al.
D559,841 S 1/2008 Liu et al.
D561,750 S 2/2008 Liu et al.
D562,814 S 2/2008 Liu et al.
D565,558 S 4/2008 Liu
7,490,800 B2 * 2/2009 Tu ........................ 248/225.21
7,522,876 B1 * 4/2009 Meitzen et al. ................ 455/7
7,763,797 B2 * 7/2010 Pak ............................. 174/60
7,785,138 B2 * 8/2010 Bonnassieux et al. ....... 439/535
2004/0192227 A1 * 9/2004 Beach et al. ............... 455/90.3
2006/0022107 A1 * 2/2006 Lim et al. ................... 248/317
2008/0198036 A1 8/2008 Songkakul et al.

* cited by examiner

WIRELESS DEVICE FOR PHYSICAL COUPLING TO ANOTHER OBJECT

BACKGROUND

The present application generally relates to the field of wireless communications. The application relates more specifically to wireless devices for communicating on wireless networks.

Wireless devices are currently used in and around buildings. Installing, setting-up, configuring, and/or otherwise providing wireless devices and networks in and around a building presents a number of challenges to those skilled in the art. Further, proper installation of wireless devices in pre-existing buildings where good wireless network coverage is desired is difficult and challenging.

SUMMARY

One embodiment of the present disclosure relates to a radio frequency (RF) device for communicating on a wireless network. The device includes an antenna coupled to an RF circuit. The device further includes a body housing the RF circuit and the antenna. The device yet further includes a support member extending from the body. The support member is configured to be coupled to an object. The support member is prevented from moving laterally and vertically relative to the object when coupled to the object. The support member and body are configured to allow the body and the antenna to rotate about an axis when the support member is prevented from moving laterally and vertically relative to the object.

Another embodiment of the present disclosure relates to an RF device for communicating on a wireless network. The RF device includes a body and a pipe. The pipe is coupled to the body and includes a first end extending away from the body that is configured to attach to a connector. The RF device further includes a transceiver circuit and an antenna housed primarily within the body. The body and the pipe defines a flag shape with the body being substantially rectangular and the pipe extending away from an edge of the body. The connector may be a conduit coupling or a trade-size electrical metal tubing coupler or a connector having a set screw. The pipe is configured to be securely held by the set screw.

Another embodiment of the present disclosure relates to a radio frequency (RF) device for communicating on a wireless network. The RF device includes an RF circuit and antenna and a substantially rectangular body surrounding the RF circuit and an antenna. The rectangular body has a first side edge, a second side edge, a top edge, and a bottom edge. The RF device further includes a support member extending from one or both of the first side edge and the bottom edge. The support member secures the device to an object such as an equipment panel or a wire conduit via a connector. The support member defines an axis and the RF device is configured to rotate about the axis when the connector is not tightened.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

According to a preferred embodiment, a wireless device is configured to be secured to another object such as a piece of wiring conduit or an equipment panel. The wireless device includes an antenna and an RF circuit. The wireless device further includes a body housing the antenna and RF circuit. The wireless device also includes a structure (or structures) that allows for easy repositioning or adjustment of the device.

Figure 1:
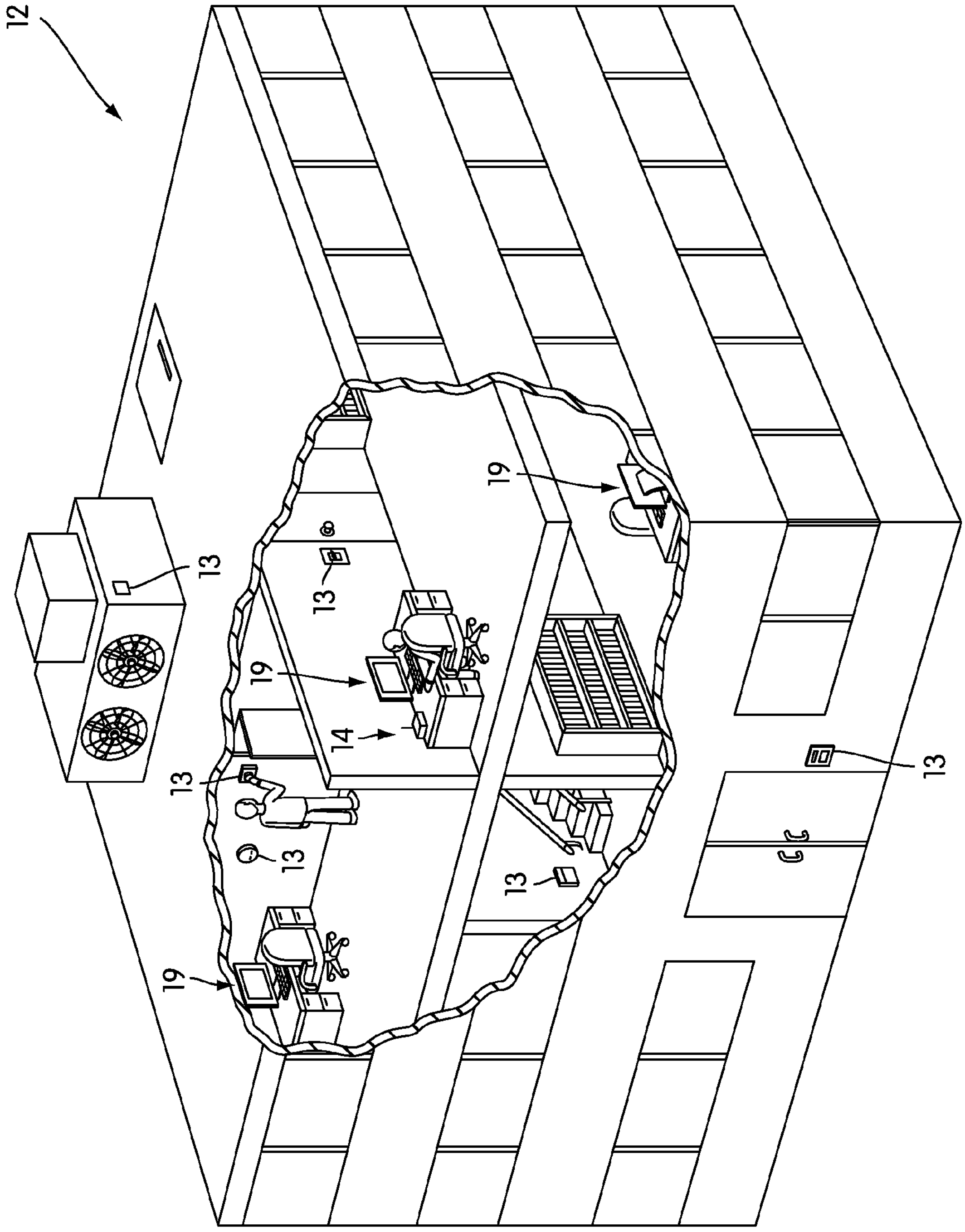
FIG. 1 is a cut-away perspective view of a building having a plurality of RF-enabled devices, according to an exemplary embodiment.

FIG. 1 is a perspective view of a building 12 having a plurality of RF-enabled devices 13. As illustrated, building 12 may include any number of floors, rooms, spaces, zones, and/or other building structures. According to various exemplary embodiments, building 12 may be any area of any size or type, and may include an outdoor area. RF-enabled devices 13 may exist inside or outside the building, on walls or on desks, be user interactive or not, and may be any type of building automation device. For example, RF-enabled devices 13 are illustrated as a security device, a light switch, a fan actuator, a temperature sensor, a thermostat, a smoke detector, etc. Device 14 is shown as a desktop wireless device. Workstation 19 is shown as a personal workstation. RF-enabled devices 13 may be configured to conduct building automation functions (e.g., sense temperature, sense humidity, control a building automation device, etc.). RF-enabled devices 13 may also serve any number of network functions (e.g., RF measuring functions, network routing functions, meshed network functions, etc.). Device 14 may serve as a network coordinator, wireless access point, router, switch, hub, and/or serve as another node on a network. Workstations 19 may allow building engineers to interact with device 14, RF-enabled devices 13, and/or to use the devices for wireless communication tasks.

Figure 2:
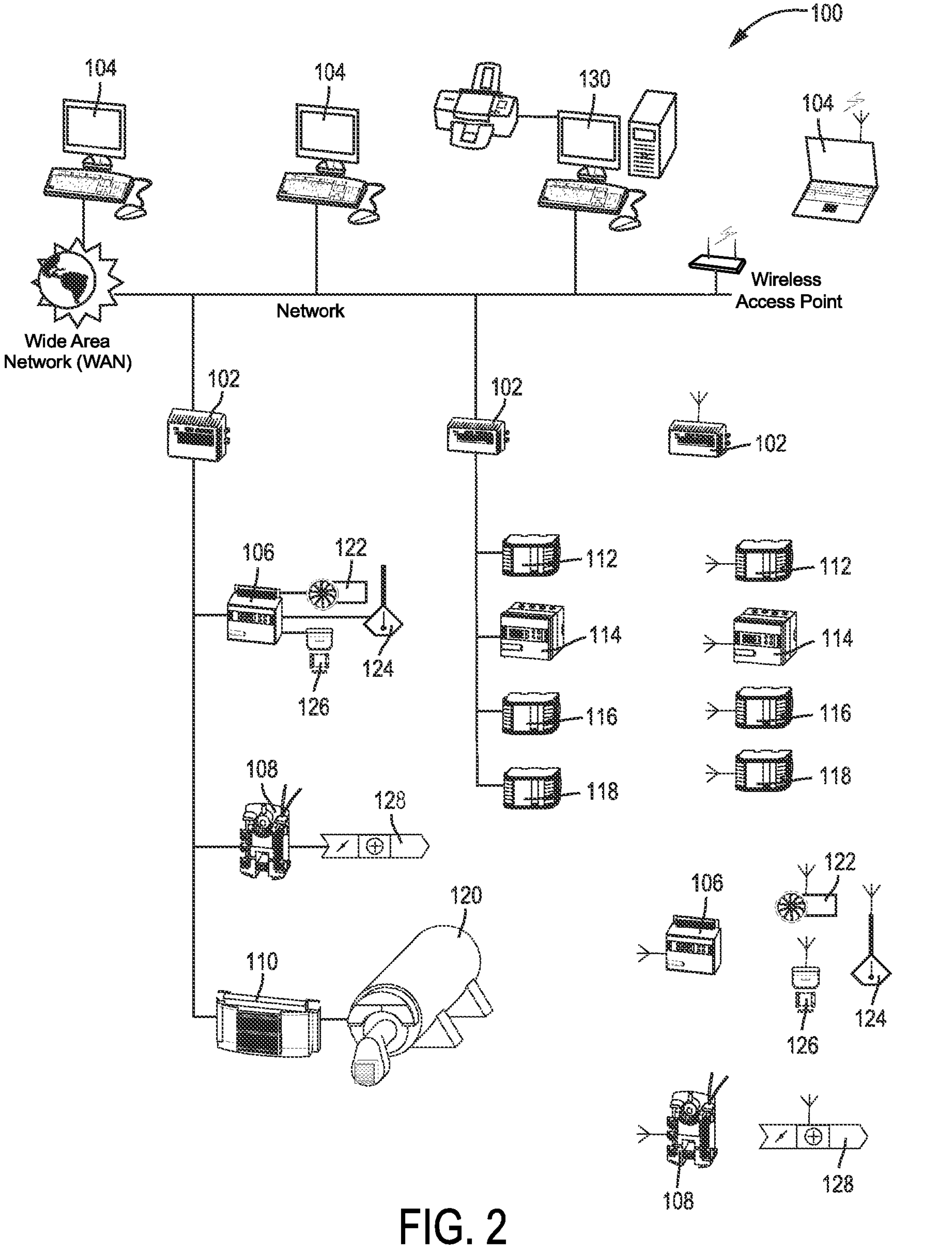
FIG. 2 is a schematic diagram of a building automation system for the building of FIG. 1, according to an exemplary embodiment.

Referring to FIG. 2, a schematic diagram of a building automation system (BAS) 100 is shown, according to an exemplary embodiment. BAS 100 may include one or more network automation engines (NAE) 102 connected to a proprietary or standard communications network such as an IP network (e.g., Ethernet, WiFi, ZigBee, Bluetooth, etc.). The network may be wired, wireless, or both wired and wireless and may utilize any number of past, present, or future communications technologies. NAE 102 may support various field-level communications protocols and/or technology, including various Internet Protocols (IP), BACnet over IP, BACnet Master-Slave/Token-Passing (MS/TP), N2 Bus, N2 over Ethernet, Wireless N2, LonWorks, ZigBee, and any number of other standard or proprietary field-level building automation protocols and/or technologies. NAE 102 may include varying levels of supervisory features and building automation features. A user interface of NAE 102 may be accessed via a device 104 capable of communicably connecting to and accessing NAE 102. For example, FIG. 2 shows multiple devices 104 that may variously connect to NAE 102 or other devices of BAS 100. For example, a device 104 may access BAS 100 and connected NAEs 102 via a WAN, local IP network, or via a connected wireless access point. Terminal 130 may also access BAS 100 and connected NAEs 102 and provide information to another source, such as a printer.

An NAE 102 may have any number of BAS devices variously connected to it. These devices may include, among other devices not mentioned here, devices such as: field-level control modules 106, Variable Air Volume Modular Assemblies (VMAs) 108, integrator units 110, variable air volume devices 112, extended digital controllers 114, unitary devices 116, air handling unit controllers 118, boilers 120, fan coil units 122, heat pump units 124, unit ventilators 126, Variable Air Volume (VAV) units 128, expansion modules, blowers, temperature sensors, flow transducers, sensors, motion detectors, actuators, dampers, air handling units, heaters, air conditioning units, etc. These devices may generally be controlled and/or monitored by NAE 102. Data generated by or available on the various devices that are directly or indirectly connected to NAE 102 may be passed, sent, requested, or read by NAE 102. This data may be stored by NAE 102, processed by NAE 102, transformed by NAE 102, and/or sent to various other systems or terminals of the building automation system. As shown in FIG. 2, the various devices of the BAS 100 may be connected to NAE 102 with a wired connection or with a wireless connection.

Figure 3:
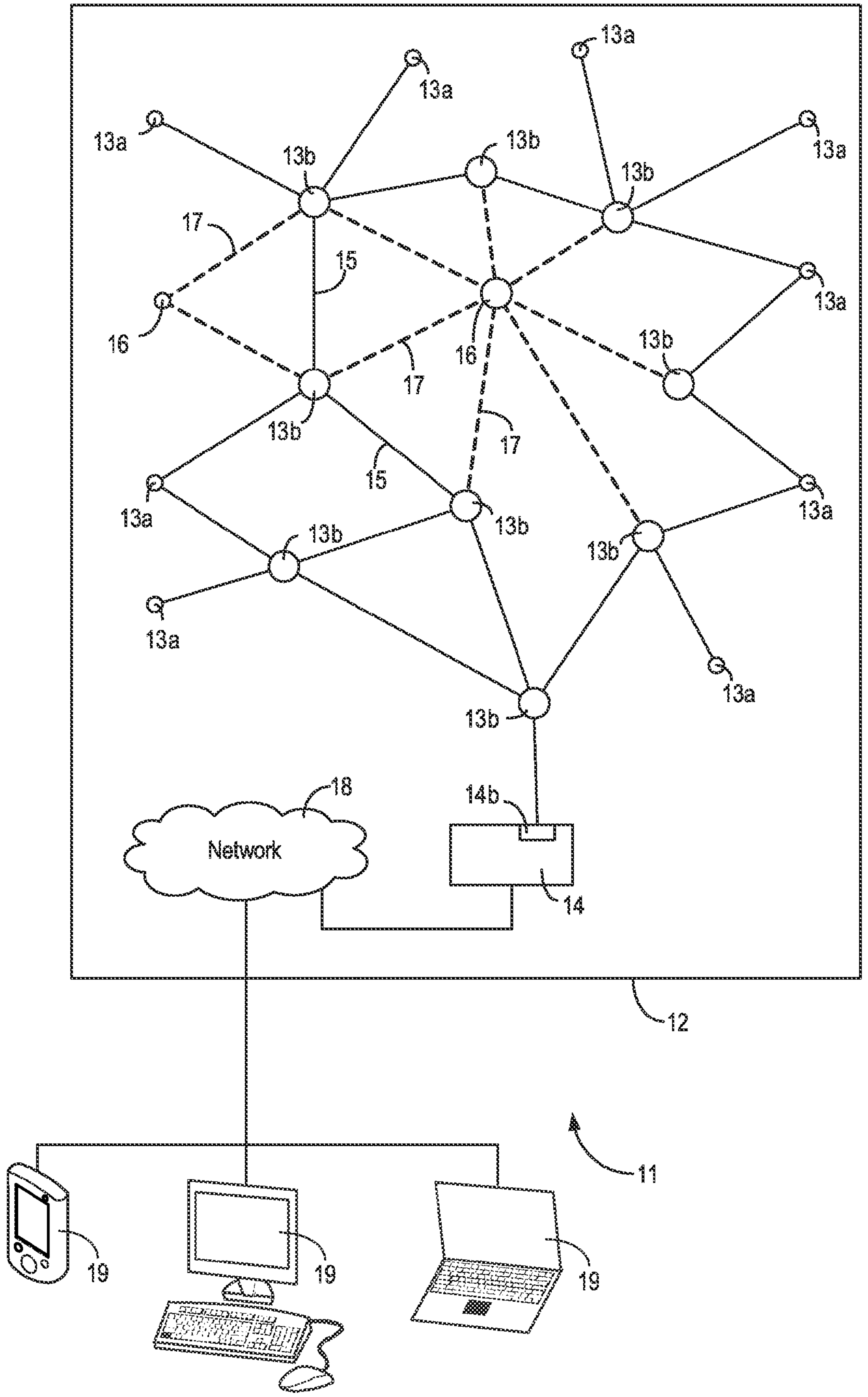
FIG. 3 is a block diagram of a mesh network for the building of FIG. 1, according to an exemplary embodiment.

FIG. 3 is a block diagram of a mesh network 11, according to an exemplary embodiment. In the illustrated embodiment, mesh network 11 is located within or around a building 12 and includes a plurality of RF-enabled devices 13, a controller system 14, a network 18, and a workstation 19 (e.g., a desktop computer, a personal digital assistant, a laptop, etc.). RF-enabled devices 13 are interconnected by RF connections 15 displayed as solid lines on FIG. 3. RF connections may be disabled (or otherwise unavailable) for various reasons (displayed as RF connections 17). As a result, some RF-enabled devices 16 may temporarily be disconnected from the mesh network, but are configured to automatically connect (or reconnect) to any other suitable device 13 within range. Controller system 14 may be connected to workstation 19 via network 18. According to other exemplary embodiments, RF-enabled devices 13 may be arranged in any other type of network topology.

Using a plurality of low-power and multi-function or reduced function wireless devices distributed around a building and configured in a mesh network, a redundant, agile, and cost-effective communications system for building automation systems may be provided.

According to an exemplary embodiment, devices 13 are ZigBee compatible devices. ZigBee is the name of a specification related to low cost and low power digital radios. The ZigBee specification describes a collection of high level communication protocols based on the IEEE 802.15.4 standard. A ZigBee compatible device is a device generally conforming to ZigBee specifications and capable of existing or communicating with a ZigBee network. In other exemplary embodiments, RF-enabled devices 13 could be any kind of radio frequency communicating wireless device including, but not limited to, Bluetooth devices and traditional 802.11 (Wi-Fi) based devices. According to an exemplary embodiment, RF-enabled devices 13 may be any type of ZigBee device including: a ZigBee coordinator, a ZigBee router, a ZigBee end device, etc. ZigBee coordinators and routers are generally RF-enabled devices that can act as intermediate routers and may pass data to and from other RF-enabled devices on the network. These devices are sometimes referred to as "full function" devices. Conversely, ZigBee end devices may not be able to relay data from other devices back onto the network. These devices are sometimes referred to as "reduced function" devices.

Figure 4:
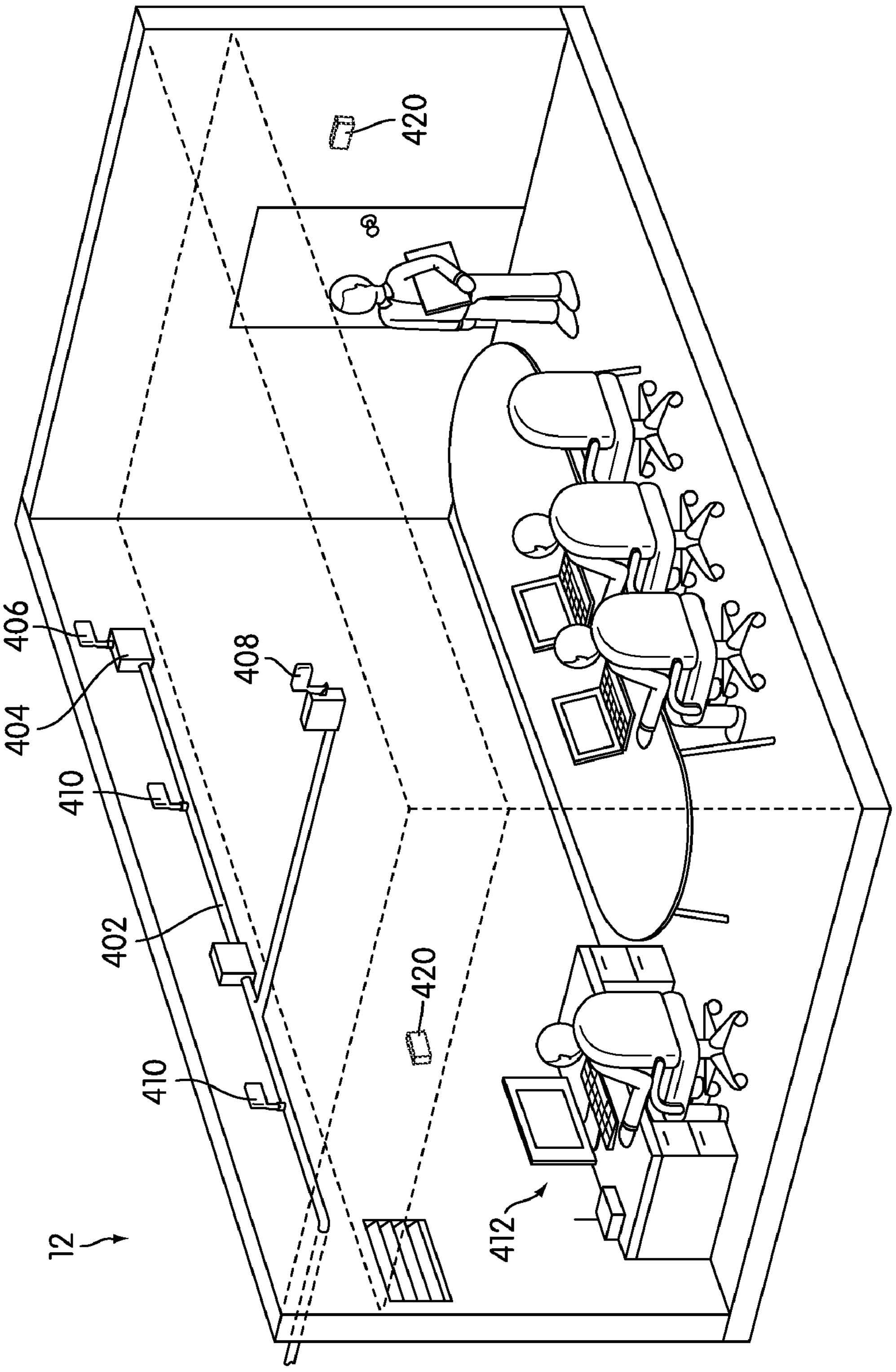
FIG. 4 is an perspective view of a room showing several RF devices coupled to a mesh network, according to an exemplary embodiment.

Referring to FIG. 4, a portion of building area 12 is shown illustrating wireless devices 406, 408, and 410 installed at varying locations. Wireless devices 406, 408, and 410 may be RF-enabled devices 13 of mesh network 11 as shown in FIGS. 1 and 3, BAS devices of FIG. 2, or otherwise. Wireless devices 406 and 408 may be coupled to objects such as enclosures 404 (see FIGS. 5A and 5B). Enclosures 404 (e.g., metal enclosures, junction boxes, plastic enclosures, equipment panels, etc.) may be configured to house wired components relating to the network, a supply of power, a building automation device, wires relating to other devices or systems, or otherwise. Wires in a building are often housed in enclosures 404 and/or conduit 402 to comply with construction codes, electrical codes, safety codes, or otherwise. Wireless devices 410 are shown as coupled to conduit 402. Wireless devices 406, 408, and 410 may be provided in various locations in building area 12 such as in the plenum air space formed by a suspended ceiling. Wireless devices 406, 408, and 410 may also be located within walls, floors, inside rooms, outside of a building, or otherwise.

According to an exemplary embodiment, wireless devices 406, 408, and 410 are spaced such that they are less than fifteen meters from a neighboring wireless device. According to other exemplary embodiments, wireless devices 406, 408, and 410 may be spaced further or closer to each other based on the transmission range of wireless devices 406, 408, and 410 which may be affected by factors such as RF signal absorption and reflection by metal obstructions, walls, floors, furniture, etc. According to various exemplary embodiments, the transmission range may be extended to approximately 250 meters or greater. Devices 406, 408, and 410 may be configured to operate optimally when a device has a line of sight to one or more neighboring devices. According to other exemplary embodiments, devices 406, 408, and 410 are substantially unaffected by objects within the line of sight. Sensors 420 and workstation 412 are examples of devices located around building area 12 that may receive and/or transmit information to and/or from wireless devices 406, 408, and 410.

Figure 5A:
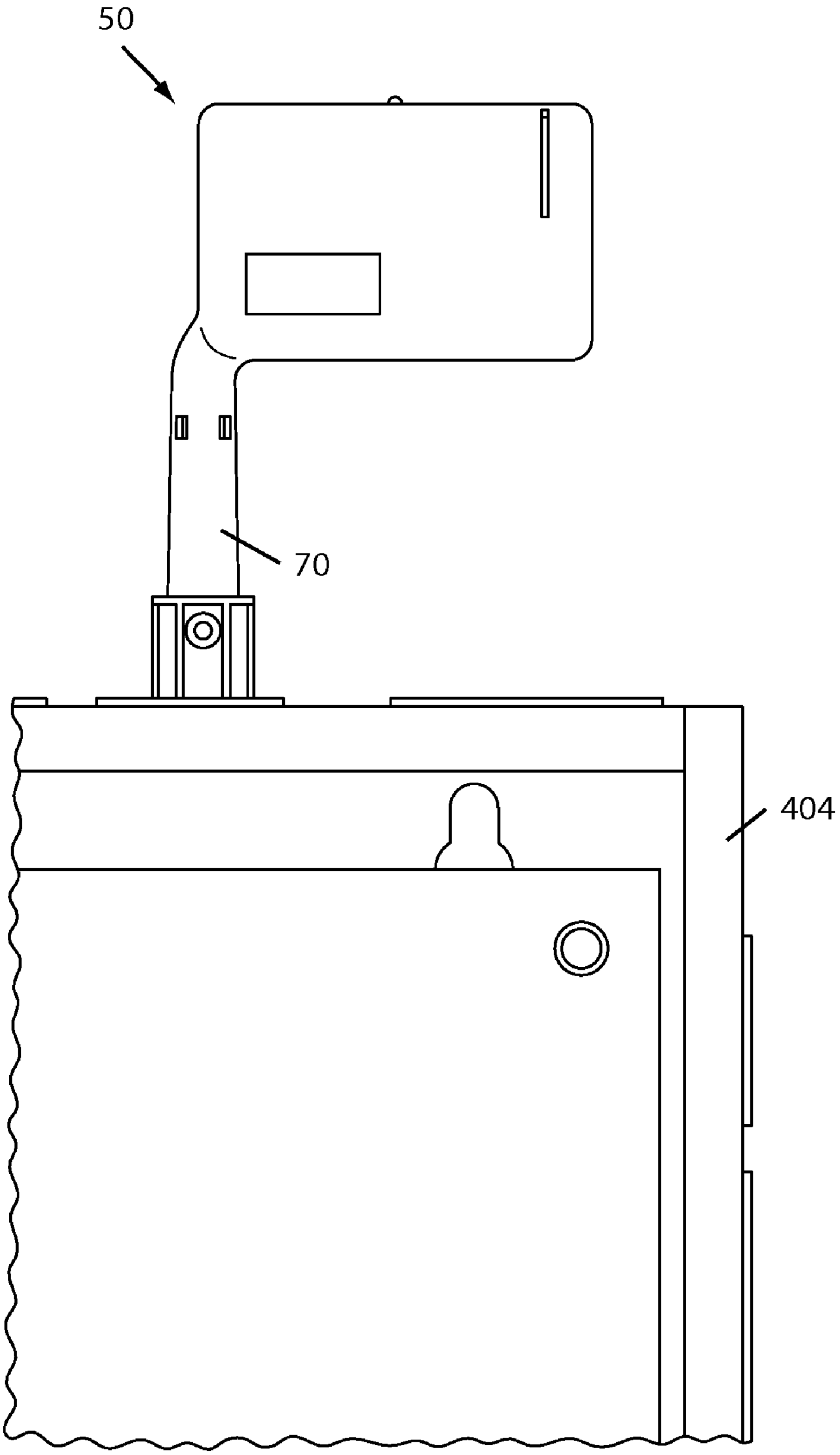
FIGS. 5A and 5B are elevation views of an RF device of FIG. 4 coupled to a metal enclosure, according to various exemplary embodiments.
Figure 5B:
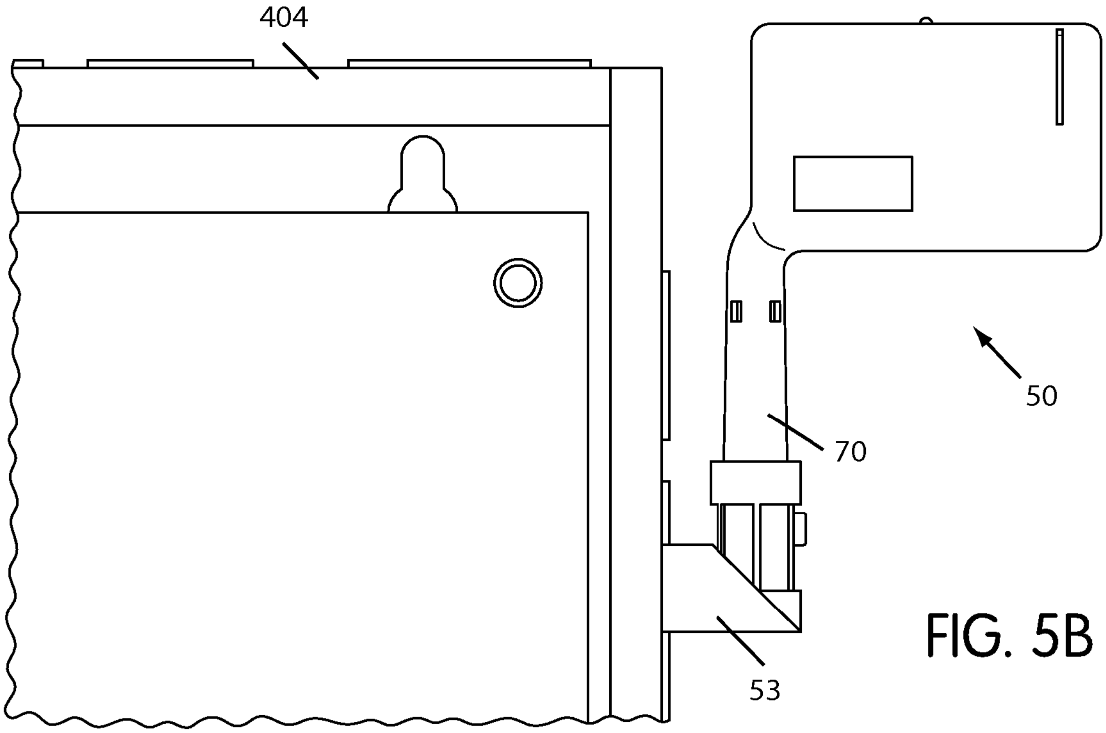

Referring to FIGS. 5A and 5B, wireless device 50 is shown coupled to an object, such as enclosure 404 (see FIG. 4), according to an exemplary embodiment. FIG. 5A is an illustration of wireless device 50 attached to the top of enclosure 404, and FIG. 5B is an illustration of wireless device 50 attached to a side of enclosure 404. Wireless device 50 may be attached to an object in other positions, according to other exemplary embodiments. Wireless device 50 is shown to include support member 70. Support member 70 is generally configured to be secured to an object such as enclosure 404 or conduit 402 (shown in various other FIGS.). Wireless device 50 is shown as a generally flag-shaped member.

Referring to FIG. 5B, another apparatus or method for attaching wireless device 50 to enclosure 404 is shown. Support member 70 is shown as being generally the same shape as illustrated in FIG. 5A, but wireless device 50 may use a element 53, such as a knob or elbow, to attach to metal enclosure 404. Wireless device 50 may be secured to prop 53 in a variety of ways (e.g., using an adhesive, a fastener such as a screw, a pin, etc.). Wireless device 50 may be attached to the bottom, top, any side, a corner, an edge, or other structure of enclosure 404 with or without the assistance of prop 53.

Figure 5C:
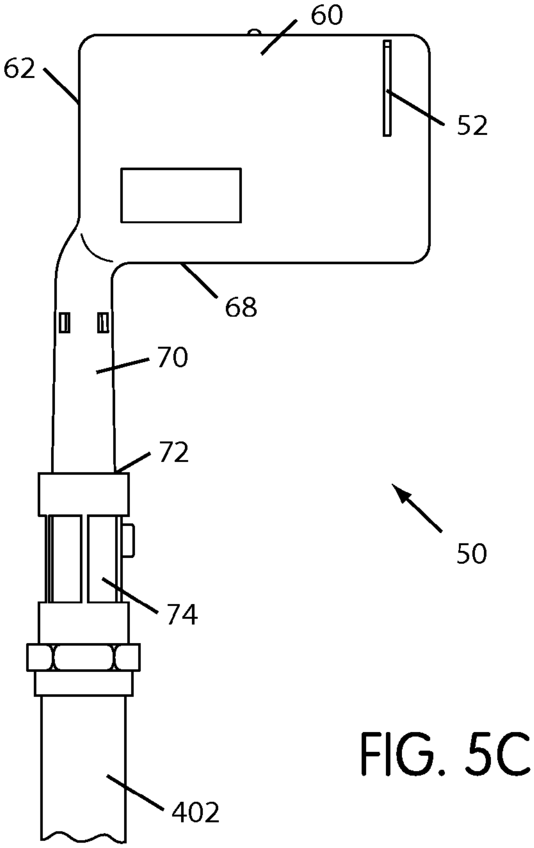
FIG. 5C is a view of the RF device of FIGS. 5A and 5B shown independently, according to an exemplary embodiment.

Referring to FIG. 5C, wireless device 50 is shown coupled to conduit 402, according to an exemplary embodiment. Wireless device 50 includes a body 60 that houses (or substantially surrounds) antenna 52 and RF circuit 56 (shown in subsequent figures). Support member 70 (e.g., pipe, tube, etc.) is shown as an elongated structure (hollow or not) that is coupled to one or both of the first side edge 62 and the bottom edge 68 of body 60. Support member 70 extends away from body 60. According to other exemplary embodiments, support member 70 may extend from or attach to body 60 in a variety of ways. According to an exemplary embodiment, support member 70 is integrally formed with at least a portion of body 60. According to other exemplary embodiments, support member 70 may be formed separately from body 60 and coupled to body 60 via an adhesive, a snap-fit, a compression fit, a screw fit, a fastener, or otherwise.

According to an exemplary embodiment, body 60 is formed from a plastic material. According to other exemplary embodiments, body 60 (or parts thereof) and/or support member 70 may be formed from a suitable metallic material and may be a different shape. According to yet other exemplary embodiments, body 60 (and/or support member 70) may be formed from any suitable material or combination of materials.

Further referring to FIG. 5C, support member 70 is shown to include an end 72 configured to be received by a connector 74 that couples wireless device 50 to an object such as a fitting on conduit 402 or enclosure 404. Support member 70 is shown secured to conduit 402 via connector 74.

According to one exemplary embodiment, connector 74 is a standard electrical metal tubing connector such as a one-half inch electrical metal tubing (EMT) connector. Support member 70 may have a diameter of approximately thirteen millimeters at end 72 such that end 72 (and thereby support member 70) may be accepted by a one-half inch EMT connector. According to other exemplary embodiments, connector 74, support member 70, and/or end 72 may be sized differently to connect wireless device 50 to different objects, fittings, and/or connectors. Various methods by which connector 74 might secure wireless device 50 to various objects are described in greater detail with reference to subsequent figures.

Referring to FIGS. 6 through 13, various views of wireless device 50 are shown, according to an exemplary embodiment. FIGS. 6A and 6B are rear and front isometric views of wireless device 50, according to an exemplary embodiment. Wireless device 50 is shown as a generally flag-shaped member that includes an antenna 52 (shown in FIGS. 6B, 12, and 13) coupled to RF circuit 56 (shown in FIG. 13), a body 60 that houses RF circuit 56, antenna 52, and a support member 70 that extends from body 60. Body 60 may further include a panel 54. Panel 54 may include any number of text instructions for installation, markings, operational indicators, or otherwise.

As shown in FIGS. 6 through 12, cable 80 (e.g., cable, wire, etc.) extends through support member 70 for connecting RF circuit 56 to a wired component.

Figure 6A:
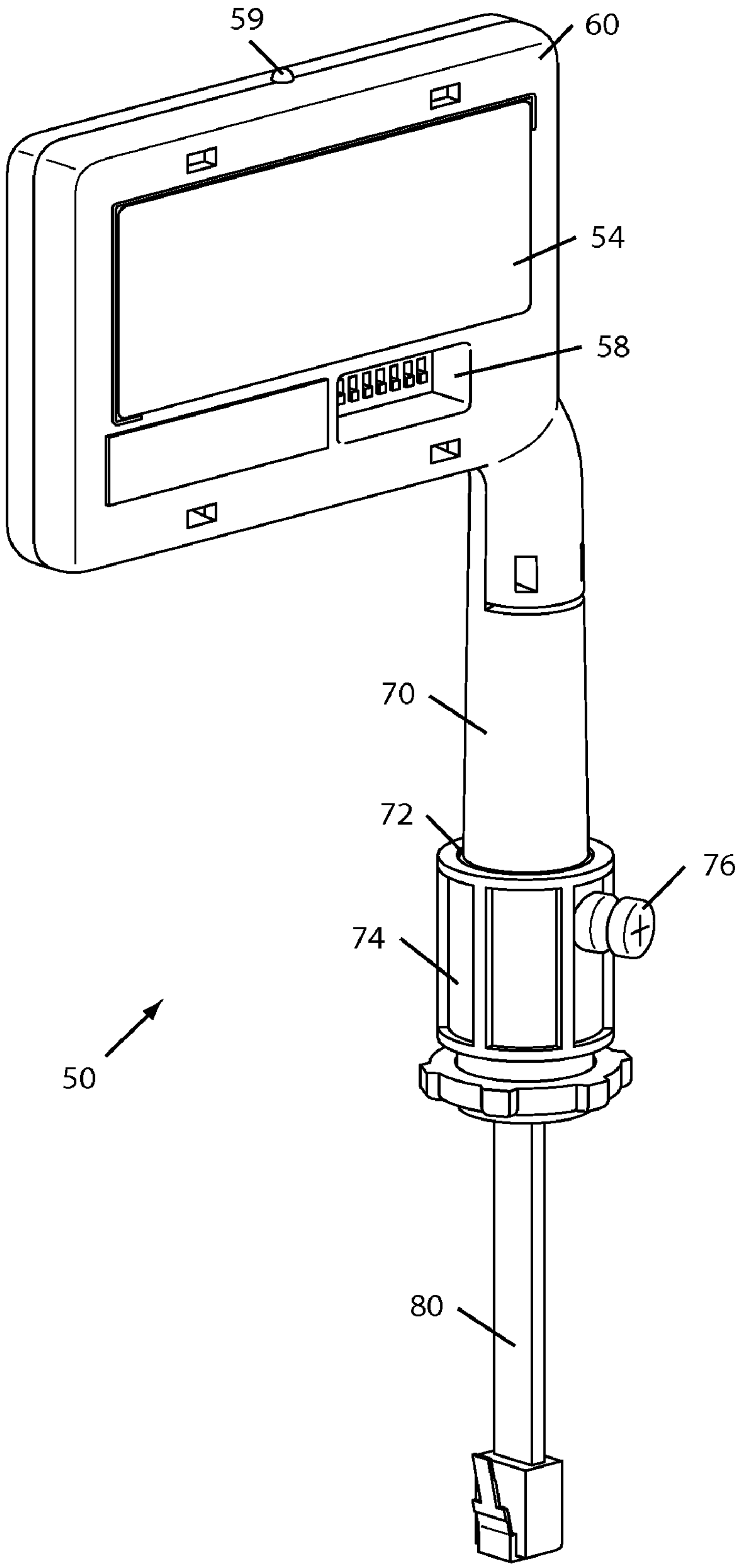
FIGS. 6A and 6B are rear and front isometric views of an RF device of FIG. 4, according to an exemplary embodiment.
Figure 6B:
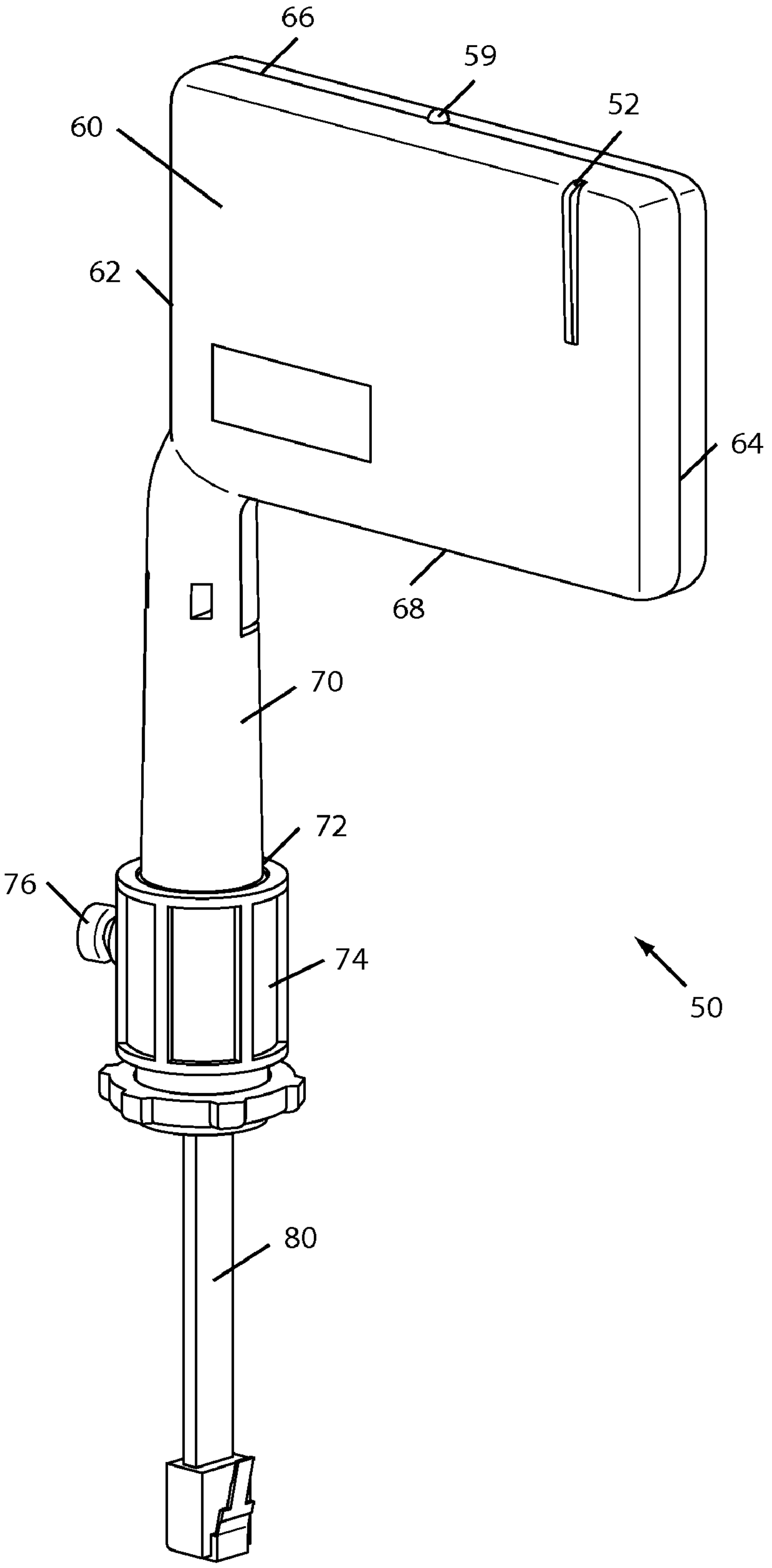

RF circuit 56 may include or communicate with one or more switches. For example, dual inline package (DIP) switches 58 are shown in FIG. 6A that allow a user to control a configuration setting or an operational parameter of the device. DIP switches 58 may be used in various ways. For example, DIP switches 58 may be used to configure wireless device 50 to communicate as a certain type of device (e.g., a routing device, a reduced function device, etc.). A device address may also be specified using DIP switches 58. According to other exemplary embodiments, various switches 58 may be used for various purposes. For example, the first three switches of DIP switches 58 may be used to determine a supervisory group address and four other switches of DIP switches 58 may be used to determine a network number address. According to other various embodiments, only a single switch may be provided, no switches may be provided, and/or any number of switch or button types other than DIP switches may be provided to the device.

RF circuit 56 (shown in FIG. 13) may further include or be coupled to a light source 59 (e.g., a light emitting diode or LED) to indicate connectivity or signal strength. According to one exemplary embodiment, light source 59 illuminates when wireless device 50 is a member of a wireless network and periodically flashes with varying numbers of blinks to indicate the relative strength of the RF connection of wireless device 50. For example, three blinks in three seconds may indicate a good signal quality, while one blink in three seconds may indicate a poor signal quality. The user may also recognize when wireless device 50 is disabled, not connected, not powered, or any number of states based on other light source patterns (or the lack thereof). Also, light source 59 may also indicate whether wireless device 50 is (or is not) a member of a wireless network by blinking once every five seconds. According to other exemplary embodiments, light source 59 may be configured to blink, flash, or change states at some interval to represent different statuses of wireless device 50.

Antenna 52 and RF circuit 56 are housed within a generally rectangular body 60 (e.g., enclosure, housing, compartment, etc.). Body 60 includes first side edge 62, second side edge 64, top edge 66, and bottom edge 68. According to an exemplary embodiment, body 60 is formed from a transparent polymer such that light source 59 may be seen by a user. According to other exemplary embodiments, body 60 may be predominantly opaque and include a transparent portion or opening to allow light source 59 to be seen by a user (e.g., panel 54 may be transparent). Body 60 may have a different profile to accommodate different circuit boards in other exemplary embodiments. Body 60 may further include decorative and/or ergonomic features such as rounded or beveled corners.

Connector 74 is shown to include an adjustment feature, shown as a set screw 76, that engages distal end 72 of support member 70. Set screw 76 may be used to fasten or attach wireless device 50 to an outside object. For example, if set screw 76 is loosened, support member 70 may be rotated within connector 74 to provide improved RF reception (see FIG. 13). Set screw 76 may be used to lock support member 70 in place. According to other exemplary embodiments, support member 70 may be secured with structures or by methods other than set screw 76 (e.g., using an adhesive to directly couple to connector 74, using a "slide and lock" system to lock support member 70 in place, using spring biased resistance providing elements, etc.).

Figure 7:
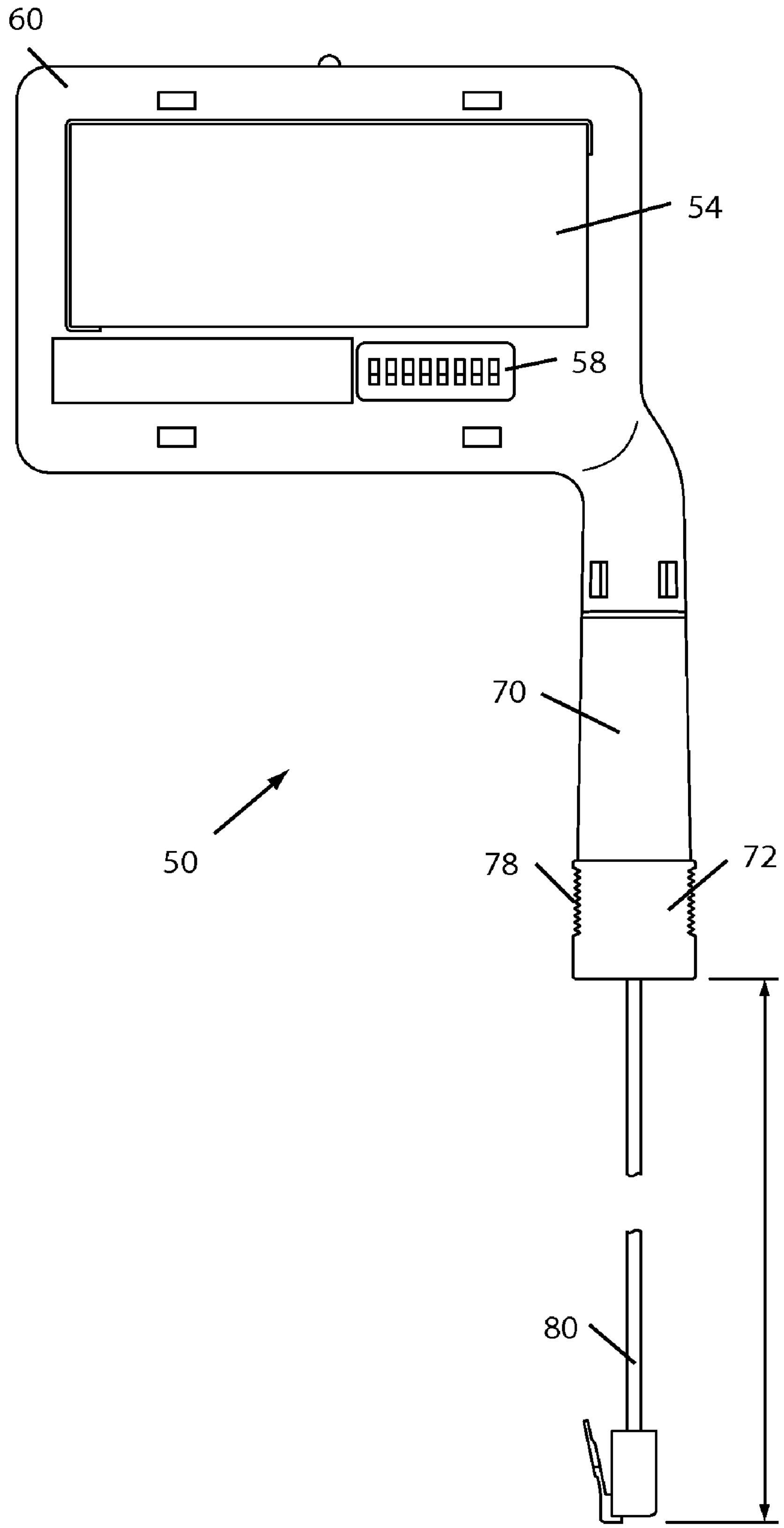
FIG. 7 is a rear view of the RF device of FIG. 6, according to an exemplary embodiment.

Referring to FIG. 7, a rear view of wireless device 50 is shown, according to an exemplary embodiment. First or distal end 72 of support member 70 includes an engagement structure, shown as ribs 78, according to an exemplary embodiment. Ribs 78 may be configured to add rigidity to first or distal end 72 and/or to facilitate the engagement of the end 72 in connector 74. For example, ribs 78 may provide friction between set screw 76 of connector 74 and support member 70, providing a secure fit.

According to an exemplary embodiment, the interior of support member 70 is in communication with the interior of body 60. Cable 80 is housed within support member 70 and couples RF circuit 56 to a wired component. The wired component may provide power and/or data to RF circuit 56. According to an exemplary embodiment, cable 80 is a six conductor cable that is configured to transfer power and data between wireless device 50 and the wired component. Support member 70 and connector 74 may simplify the positioning of device 50 by providing a structure that may easily be engaged, adjusted, and/or disengaged by installers or technical support personnel. Support member 70 and connector 74 also allow cable 80 to be enclosed between wireless device 50 and the wired component or conduit, which may be required by building and electrical codes. For example, as illustrated in FIG. 4, all wires may be contained within conduit 402 near the ceiling of building area 12. Cable 80 may have varying length, according to an exemplary embodiment. According to other exemplary embodiments, cable 80 may be coupled to RF circuit 56 via any number of jacks, terminals, cable types, solder points, or other methods. The device body may be configured to separate into two halves or otherwise facilitate the coupling of a cable to the RF circuit.

Figure 8:
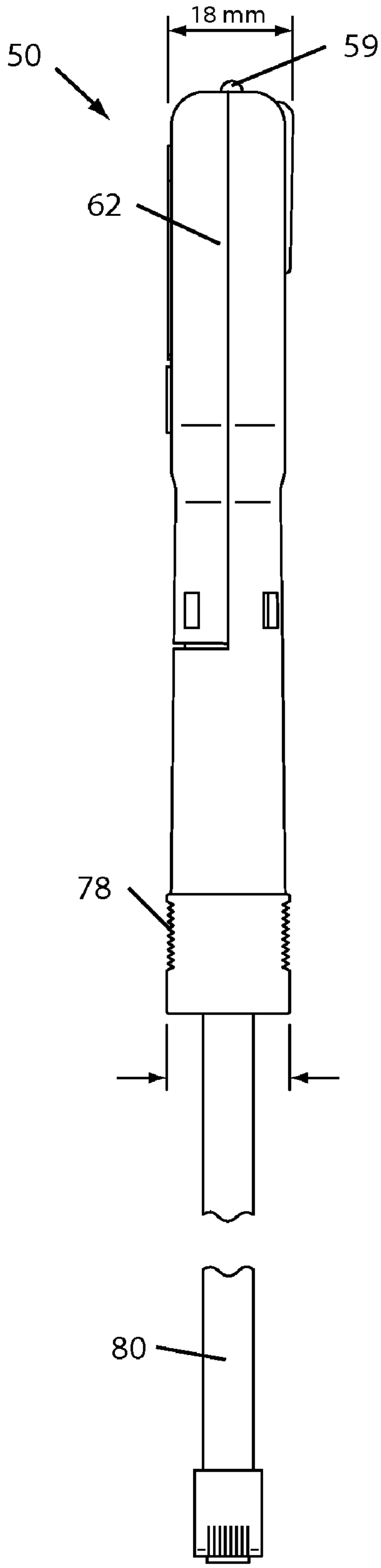
FIGS. 8 and 9 are side views of the RF device of FIG. 6, according to an exemplary embodiment.
Figure 9:
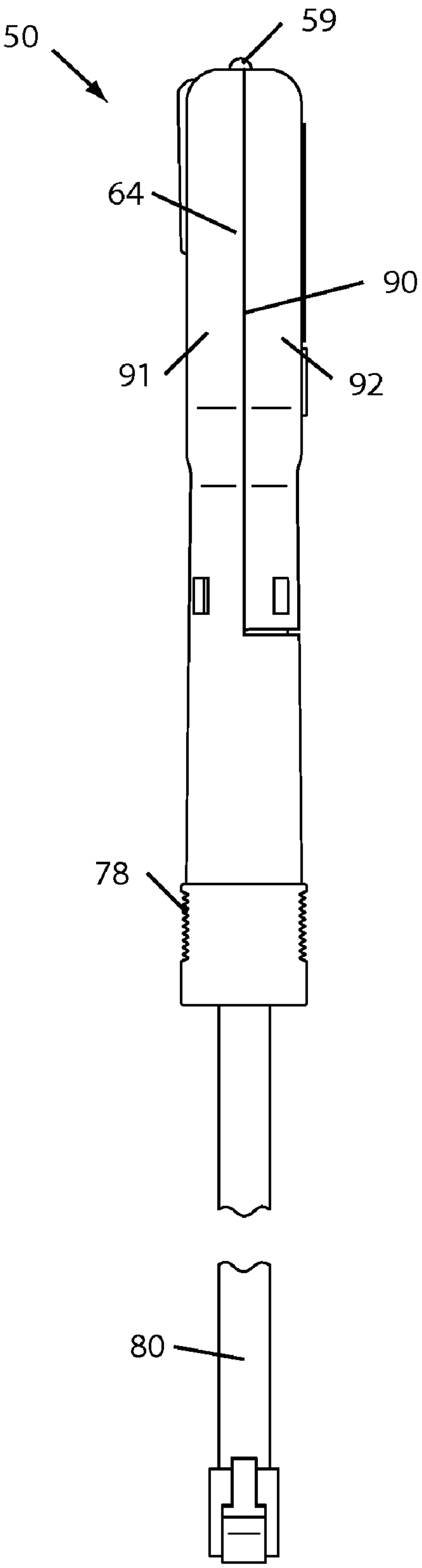
Figure 10:
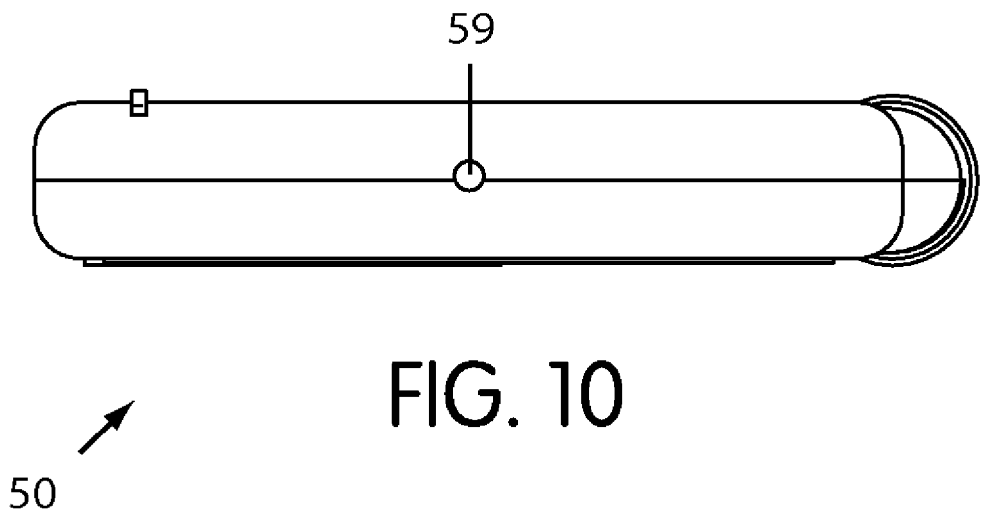
FIG. 10 is a top view of the RF device of FIG. 6, according to an exemplary embodiment.
Figure 11:
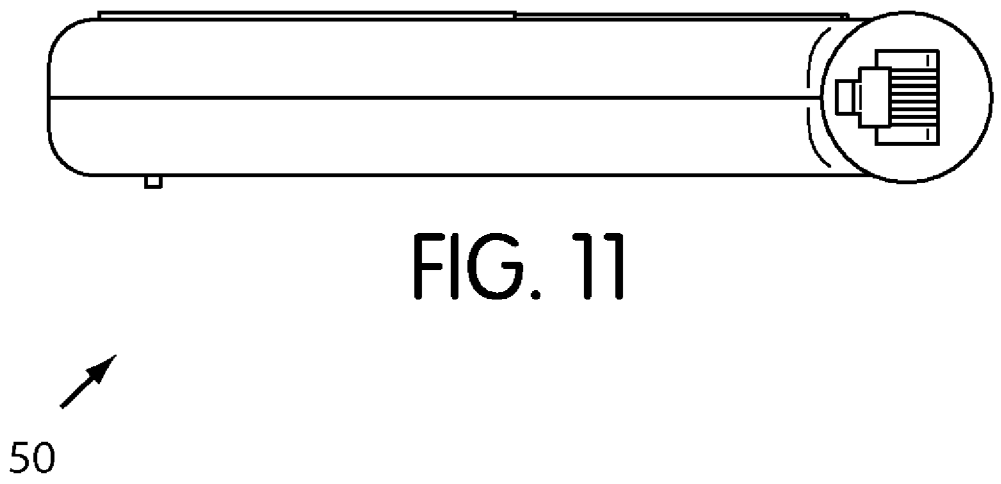
FIG. 11 is a bottom view of the RF device of FIG. 6, according to an exemplary embodiment.

Referring further to FIGS. 8-11, various views of wireless device 50 are shown, according to an exemplary embodiment. FIG. 8 is a view of first side 62 of wireless device 50. FIG. 9 is a view of second side 64 of wireless device 50. FIG. 10 is a view of top 66 of wireless device 50. FIG. 11 is a view of bottom 68 of wireless device 50.

As illustrated in FIGS. 8 and 9, wireless device 50 may be relatively thin, according to an exemplary embodiment. Wireless device 50 may be designed such that the width may be no more than approximately eighteen millimeters wide, according to an exemplary embodiment. According to other various exemplary embodiments, wireless device 50 is greater than eighteen millimeters wide, significantly smaller than eighteen millimeters, or of any suitable size.

As illustrated in FIGS. 8-10, light source 59 may be visible from multiple views of wireless device 50. The user may be able to check the status of wireless device 50 using light source 59 from any type of view as long as the view is not a bottom view. According to other exemplary embodiments, light source 59 may be located elsewhere on wireless device 50 such that it is visible in a bottom view. Multiple light sources 59 may be located on wireless device 50.

Referring further to FIG. 9, seam 90 is shown, according to an exemplary embodiment. Seam 90 defines a separation line between body half 91 and body half 92. According to an exemplary embodiment, body half 92 is configured to separate from body half 91 for service, configuration, and/or connection of cable 80 to RF circuit 56.

Figure 12:
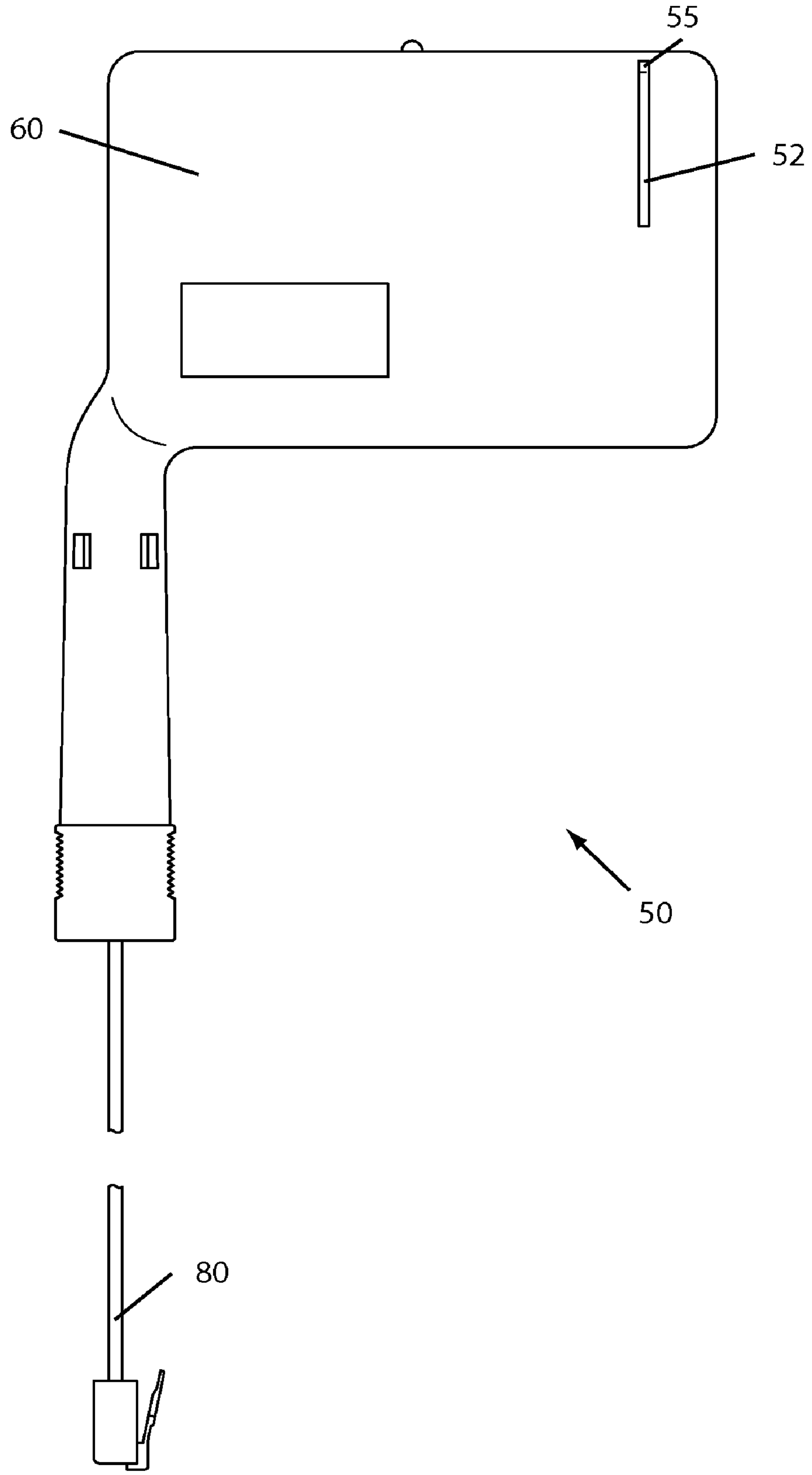
FIG. 12 is a front view of the RF device of FIG. 6, according to an exemplary embodiment.

Referring to FIG. 12, a front view of wireless device 50 is shown, according to an exemplary embodiment. RF circuit 56 (shown in FIG. 13) is configured to receive and/or transmit a wireless signal using antenna 52. Antenna 52 is communicably coupled to RF circuit 56. Antenna 52 includes a tip 55 and is rigidly coupled to RF circuit 56 and/or an element of body 60 such that the orientation of antenna 52 is constrained. According to an exemplary embodiment, the orientation of antenna 52 is adjustable, but is generally held constant when not manipulated due to resistance forces, friction, or some other element or method.

Wireless device 50 may be a repeater device, a receiver device, and/or a transmitting device. RF circuit 56 may be configured to: transmit signals received on cable 80 via antenna 52; to receive signals at antenna 52, providing the signals to a network via cable 80; and/or to retransmit wireless signals received at antenna 52 to other wireless devices or devices via antenna 52. According to one exemplary embodiment, wireless device 50 is operable on the 2.4 GHz ISM band and is capable of transmitting, receiving, and interpreting direct-sequence spread-spectrum signals. Wireless device 50 may be a low-power device. Wireless device 50 may receive power via cable 80 and/or via a power source installed on wireless device 50 (e.g., a lithium-ion battery, etc.).

Figure 13:
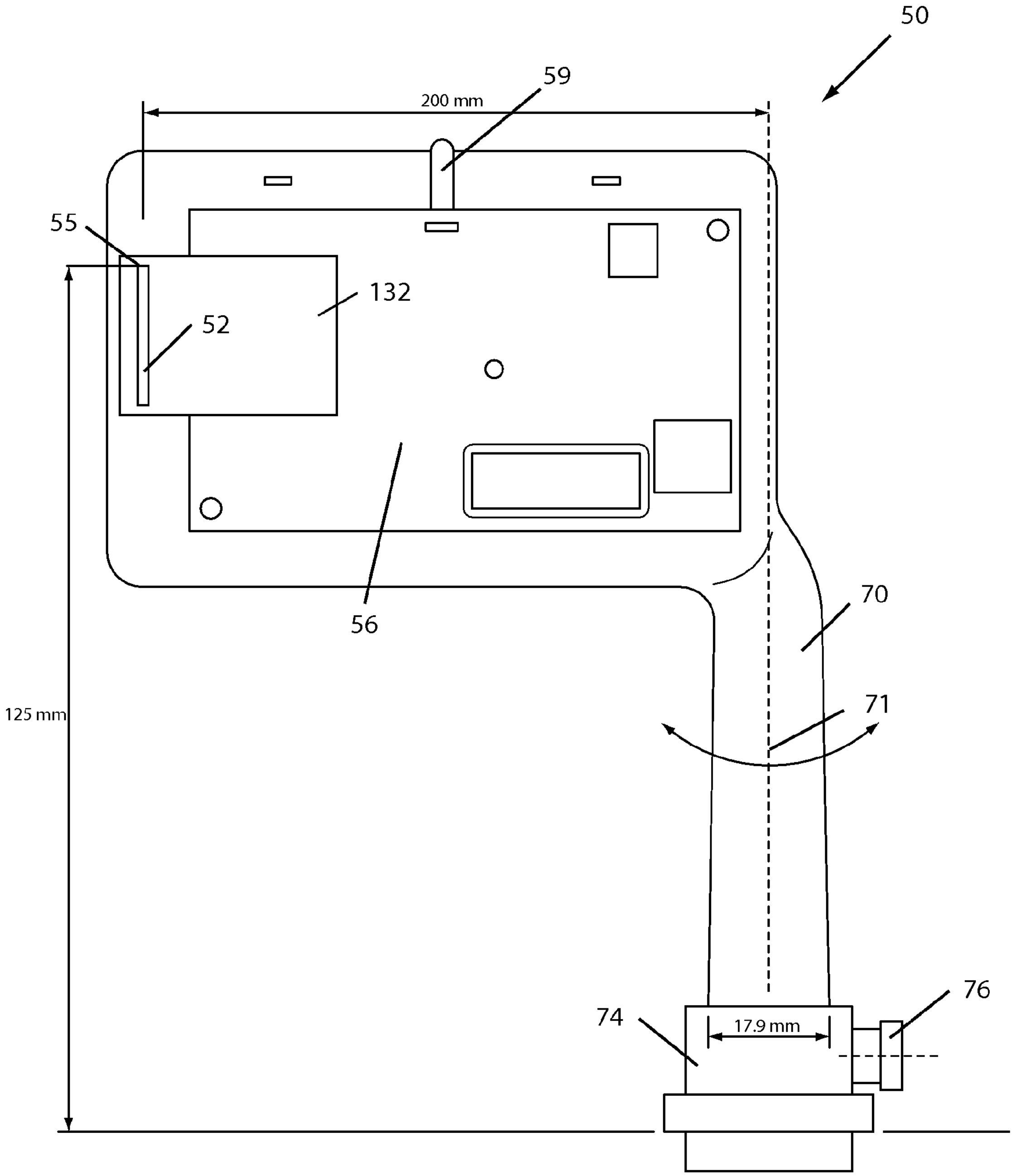
FIG. 13 is a partial cut-away view of the RF device of FIG. 6, according to an exemplary embodiment.

Referring to FIG. 13, a partial cut-away view of wireless device 50 is shown, according to an exemplary embodiment. RF circuit 56 is shown having a transceiver 132 and being operatively coupled to antenna 52. While RF circuit 56 may be mounted to a generally rectangular circuit board, it should be understood that circuit 56 may take a wide variety of shapes and may be generally rigid or flexible.

According to various embodiments in which antenna 52 may be held at one orientation relative to body 60, the geometry of wireless device 50 is intended to position antenna 52 for improved performance compared to traditional wireless devices. Traditional wireless devices often include an external movable antenna coupled to a main body. The movable antenna may often be moved either intentionally or unintentionally such that it is not oriented correctly relative to the other components (e.g., devices, nodes, antennas, etc.) of the wireless network. In a preferred embodiment, wireless device 50 is oriented such that antenna tip 55 is generally vertical. When wireless device 50 is coupled to an object as shown in FIGS. 4, 5A, and 5B, antenna tip 55 is constrained to be oriented in a generally constant (e.g., vertical) orientation (e.g., relative to the bottom edge of the device body, relative to the ground, etc.).

According to various exemplary embodiments, body 60 and support member 70 are configured to space antenna tip 55 away from the object to which wireless device 50 is coupled (e.g., the conduit 402 or metal enclosure 404 of FIG. 4, any other metal surface, etc.) to avoid susceptibility to interference (e.g., reflections) between antenna 52 and the object to which wireless device 50 is connected. According to an exemplary embodiment, the device is configured to space antenna tip 55 approximately one hundred twenty five millimeters from the object to which wireless device 50 is coupled. According to other exemplary embodiments, the device is configured to space antenna tip 55 more than one hundred and twenty five millimeters away from the object to which wireless device 50 is coupled. According to yet other exemplary embodiments, the device is configured to space antenna tip 55 at least one hundred millimeters away from the bottom of support member 70. According to yet other exemplary embodiments, support member 70 is configured to collapse or to provide variable spacing of body 60 from a connector or object.

Once installed, the position of antenna 52 may be adjusted to achieve an increased signal strength and to avoid nulls and/or multipaths in the RF signal. Body 60 is configured to space antenna tip 55 away from axis 71 (see FIG. 13). Axis 71 may be generally defined by the rotational axis of device 50 when support member 70 is installed in a connector and may be rotated within the connector. According to the various figures of the disclosure which display support member 70 as generally vertical, axis 71 may be a generally vertical axis defined by support member 70 and a side edge of body 60.

According to an exemplary embodiment, to adjust wireless device 50, the user loosens set screw 76, providing an adjustment mode that allows support member 70 to rotate in connector 74. The user may rotate wireless device about axis 71 until a relatively good RF connection is received by the device. RF circuit 56 may be configured to cause light source 59 to indicate a good RF connection. When wireless device 50 is properly positioned, the user may tighten set screw 76 to hold wireless device 50 in place (e.g., in the connector).

According to an exemplary embodiment, antenna tip 55 may be spaced approximately two hundred millimeters away from axis 71, allowing antenna tip 55 to be rotated around an approximately four hundred millimeter diameter circle. According to other exemplary embodiments, antenna tip 55 may be spaced a greater or lesser distance from axis 71 depending on the characteristics of the RF signal. By constraining wireless device 50 to a single degree of freedom (e.g., not allowing rotation about any axis other than axis 71 and not allowing x, y, and z axis translations), the installation and positioning of wireless device 50 is simplified for the user or installer. Accidental repositioning of wireless device 50 may be prevented.

According to an exemplary embodiment, wireless device 50 may be installed in a generally vertical position, allowing antenna 52 to be deployed in a generally vertical position as well. According to other exemplary embodiments, wireless device 50 may be installed in a side position and rotation of body 60 around axis 71 increases or decreases the vertical height of tip 55 relative to the ground.

According to an exemplary embodiment, the RF circuit is configured for a frequency of operation. The support member is configured to hold the antenna tip at least one wavelength of the frequency of operation above the object to reduce the effect of the object on the antenna. According to an exemplary embodiment, the body is configured to holds the antenna to allow for the adjustment of the antenna by at least three-fourths wavelength of the frequency of operation in space. The adjustment may be by rotating the body about the axis. This amount of adjustment is configured to allow the antenna to be removed from a local RF null. The spacing, configuration of the device, and/or the ability to rotate the body about the axis may also compensate for irregularities in the antenna pattern.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims.

It is important to note that the construction and arrangement of the device as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that throughout this application terms relating to the words radio frequency (e.g., "RF-enabled devices," "radio frequency," "RF," etc.) may refer to any number of frequency bands or technologies according to various exemplary embodiments. For example, the RF devices and its components may operate on any frequency or set of multiple frequencies of the electromagnetic spectrum that may enable wireless communications. According to various exemplary embodiments, the RF device may be implemented to, with, and/or by any wireless technology of the past, present or future capable of enabling wireless communications.

What is claimed is:

1. A radio frequency (RF) device for communicating on a wireless network, the device comprising:

an antenna coupled to an RF circuit;

a body housing the RF circuit and the antenna; and a support member extending from the body;

wherein the support member is configured to be coupled to an object, wherein the support member is prevented from moving laterally and vertically relative to the object when coupled to the object, wherein the support member and body are configured to allow the body and the antenna to rotate about an axis when the support member is prevented from moving laterally and vertically relative to the object.

2. The RF device of claim 1, wherein the RF circuit and antenna are entirely enclosed by the body.

3. The RF device of claim 1, wherein the RF circuit is entirely enclosed by the body and the antenna is at least partially enclosed by the body.

4. The RF device of claim 1, wherein the RF device is configured to be a transceiver device.

5. The RF device of claim 1, wherein the object is at least one of an equipment panel or conduit piping.

6. The RF device of claim 5, wherein the support member is configured to be coupled to the object via a connector and wherein the connector is an electrical metal tubing connector that receives the support member, the electrical metal tubing connector having a locknut for securing the connector to the object.

7. A radio frequency (RF) device for communicating on a wireless network, the device comprising:

a body and a pipe, the pipe coupled to the body and having a first pipe end extending away from an edge of the body and configured to attach to a connector, the connector for securing the pipe to an object; and a transceiver circuit and an antenna, the transceiver circuit and antenna housed primarily within the body, wherein the body is substantially rectangular.

8. The RF device of claim 7, wherein the connector is a conduit coupling.

9. The RF device of claim 7, wherein the connector is a trade-size electrical metal tubing coupler or connector having a set screw, and the pipe is securely held by the set screw.

10. A radio frequency (RF) device for communicating on a wireless network, the RF device comprising:

an RF circuit and an antenna;

a substantially rectangular body surrounding the RF circuit and the antenna, the rectangular body having a first side edge, a second side edge, a top edge, and a bottom edge; and a support member extending from one or both of the first side edge and the bottom edge, the support member securing the device to an object via a connector, the object being one of an equipment panel or a wire conduit.

11. The RF device of claim 10, wherein the support member defines an axis and the body is configured to rotate about the axis when the connector is not tightened.

12. The RF device of claim 11, wherein the connector is a trade-size electrical metal tubing connector having a set screw for tightening or loosening the connector's hold on the support member.

13. The RF device of claim 11, wherein the antenna includes an antenna tip and the structure of the device including the support member maintains the orientation of the antenna tip when the support member is secured to the object via the connector.

14. The RF device of claim 13, wherein the RF circuit is configured for a frequency of operation, and wherein the support member holds the antenna tip at least one wavelength of the frequency of operation above the object to reduce the effect of the object on the antenna.

15. The RF device of claim 13, wherein the RF circuit is configured for a frequency of operation, and wherein the body holds the antenna to allow for the adjustment of at least three-fourths wavelength of the frequency in space by rotating the body about the axis, the adjustment to remove the antenna from a local RF null.

16. The RF device of claim 13, wherein the support member holds the antenna tip about 125 mm away from the object when secured to the connector.

17. The RF device of claim 13, wherein the body holds the antenna tip about 200 mm away from the axis.

18. The RF device of claim 11, wherein when the support member is received by the connector and the connector is not tightened, the relationship of the support member and the connector provides only one degree of freedom for adjustment of the antenna tip, the one degree of freedom being the rotational freedom about the axis.

19. The RF device of claim 11, wherein rotating the body about the axis compensates for irregularities in the antenna pattern.

20. The RF device of claim 10, wherein a wire extends through the support member and connector from the object, and wherein the wire is not exposed when the device is installed in the connector.

21. The RF device of claim 10, wherein the rectangular body is made from a partially transparent material so that the state of an indicating LED coupled to the RF circuit and surrounded by the rectangular body is visible through the material.

22. The RF device of claim 21, wherein the LED indicates connectivity or signal strength.

23. The RF device of claim 10, further comprising a user-accessible switch is coupled to the RF circuit.

* * * * *